Aug. 27, 1968

F. GASCHE 3,398,978

RESILIENT COUPLING

Filed May 13, 1965

INVENTOR.
Fred Gasche

BY Webb-Burden Robinson & Webb

HIS ATTORNEYS

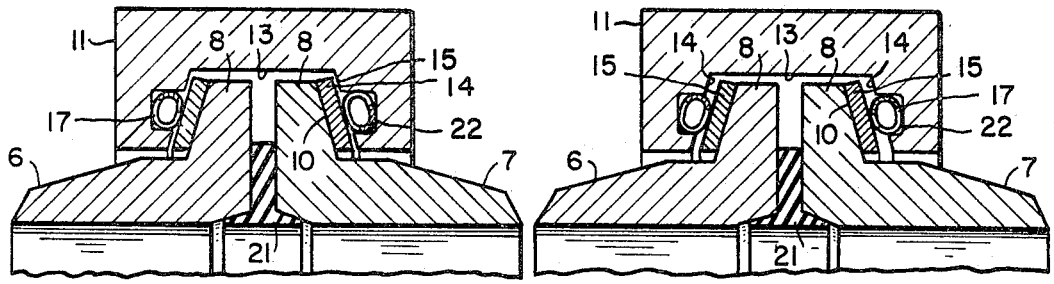
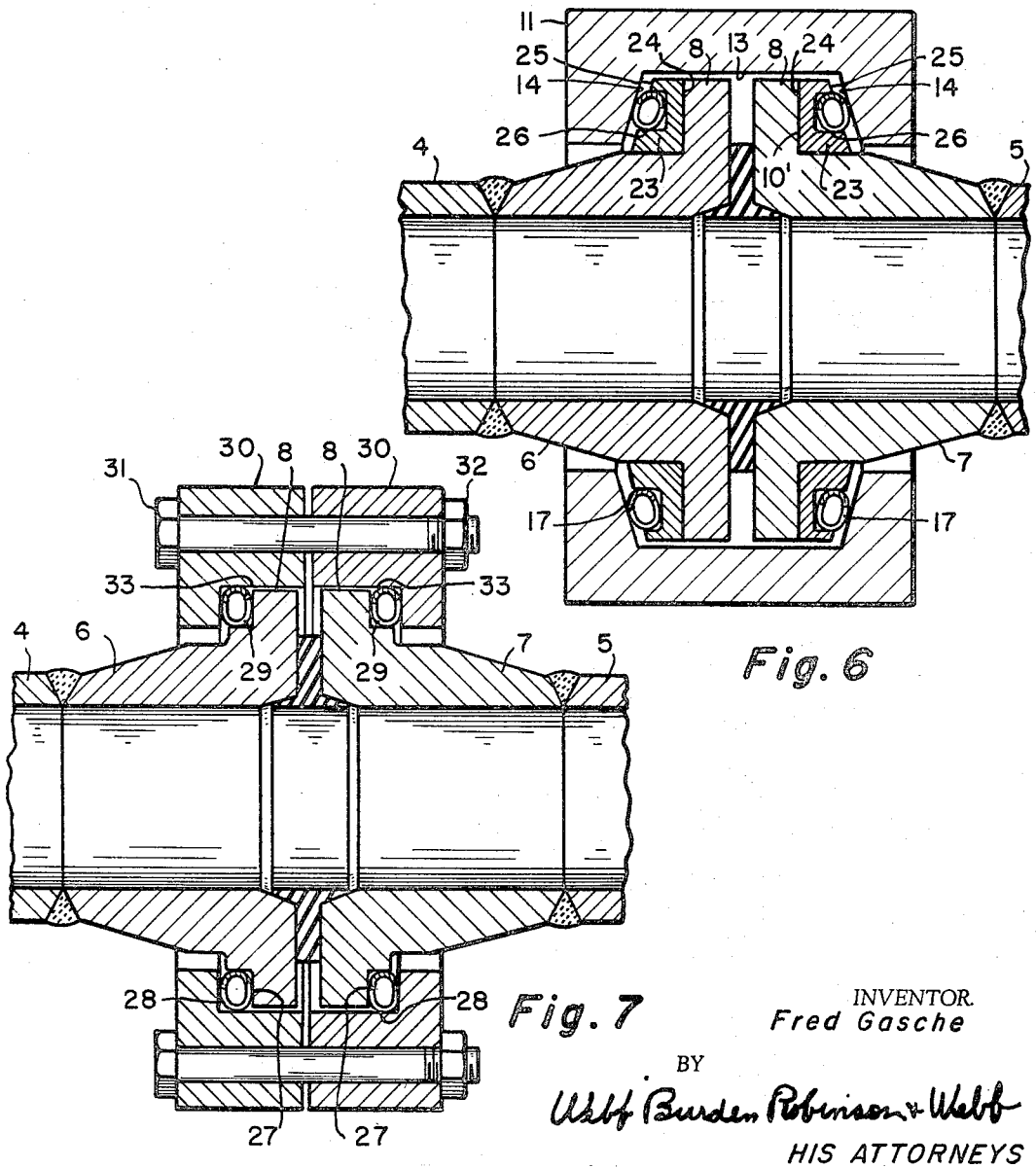

INVENTOR.
Fred Gasche

BY
Webb Burden Robinson & Webb
HIS ATTORNEYS

INVENTOR.
Fred Gasche

United States Patent Office 3,398,978
Patented Aug. 27, 1968

3,398,978
RESILIENT COUPLING
Fred Gasche, Erie, Pa., assignor to Autoclave Engineers, Inc., Erie, Pa., a corporation of Pennsylvania
Continuation-in-part of application Ser. No. 392,722, Aug. 28, 1964. This application May 13, 1965, Ser. No. 458,828
14 Claims. (Cl. 285—187)

ABSTRACT OF THE DISCLOSURE

A resilient coupling for connecting two lengths of tubing which are subjected to extreme and cycling pressures and temperatures having hubs secured to the tube ends. Flanges extend radially from each hub presenting surfaces facing each other and second surfaces axially removed from the facing surfaces. A split clamp surrounds the hubs and has surfaces extending opposite to the axially removed surfaces. A resilient ring-like member extends around at least one hub in a space between the flange surface and opposed surface on the clamp. Means draw the clamp portions together and compress the tubular resilient member.

---

This application is a continuation in part of my copending application Ser. No. 392,722, filed Aug. 28, 1964, and now abandoned, and relates to a resilient coupling, more particularly, a coupling for securing lengths of pipe end to end. The coupling is particularly useful for joining lengths of pipe or tubing which are subjected to extreme and cycling pressure and temperature conditions; for example, pipes in which liquid nitrogen is transported under pressures between 4000 and 5000 lbs. to the square inch. By reason of its resilience, the coupling will maintain a tight joint in spite of extreme and cycling variations in dimensions due to thermal expansion and contraction of its parts. The coupling is particularly useful in applications where temperatures or pressures are frequently cycled between extreme high or low temperatures or pressures and ambient conditions or between extreme high temperatures and pressures and extreme low temperatures and pressures.

Briefly stated, the resilient coupling of this invention comprises a pair of hubs each of which is secured to one end of the tubes to be coupled. Each hub has a flange which extends radially from the end of the hub opposite to the end which is secured to the tubing. The flange may be integral with the hub or may be formed by a flange ring surrounding the hub. Each flange has a surface adapted to face the corresponding surface on the flange of the other hub and a second surface axially removed from the facing surface. A split clamp substantially surrounds the hubs and has portions having surfaces which extend opposite to but spaced from the outwardly extending surfaces of the flanges which are removed from the facing surfaces. A resilient ring-like member having a tubular cross section extends around at least one of the hubs in the space between the axially removed surface on the flange and the opposed surface of the clamp. Means draw the clamp portions toward each other moving the hubs toward each other and compressing the resilient member.

In the accompanying drawings, I have illustrated certain presently preferred embodiments of my invention in which:

FIGURE 4 is a longitudinal half section of a modified form of coupling showing the positions of the parts when the interior of the coupling is subjected to low temperatures relevant to ambient temperature;

FIGURE 5 is a longitudinal half section of a modified form of coupling showing the positions of the parts when the interior of the coupling is subjected to high temperatures relevant to ambient temperature;

Figure 8:
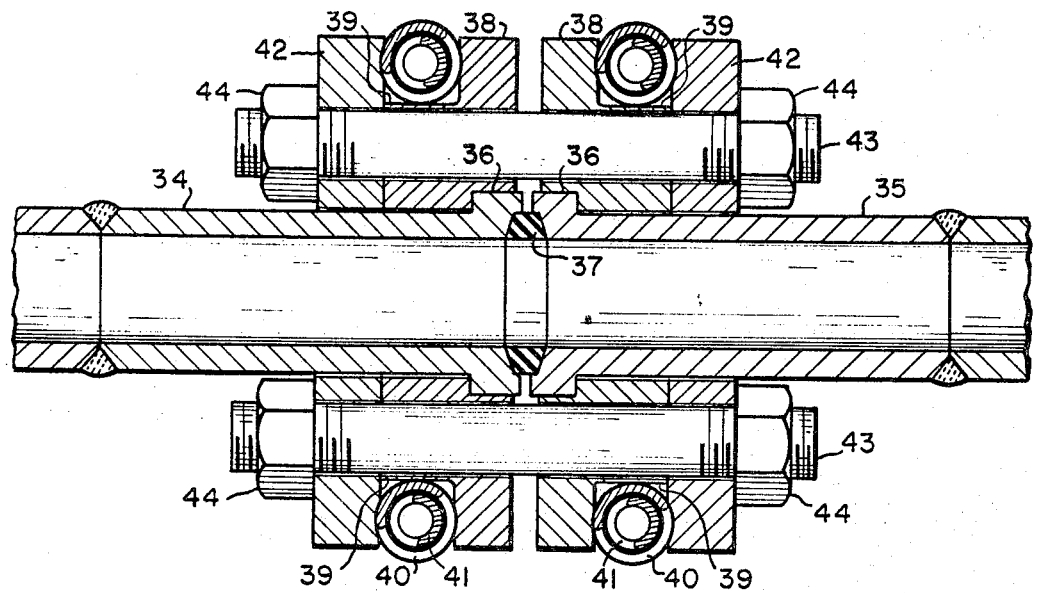
Figure 9:
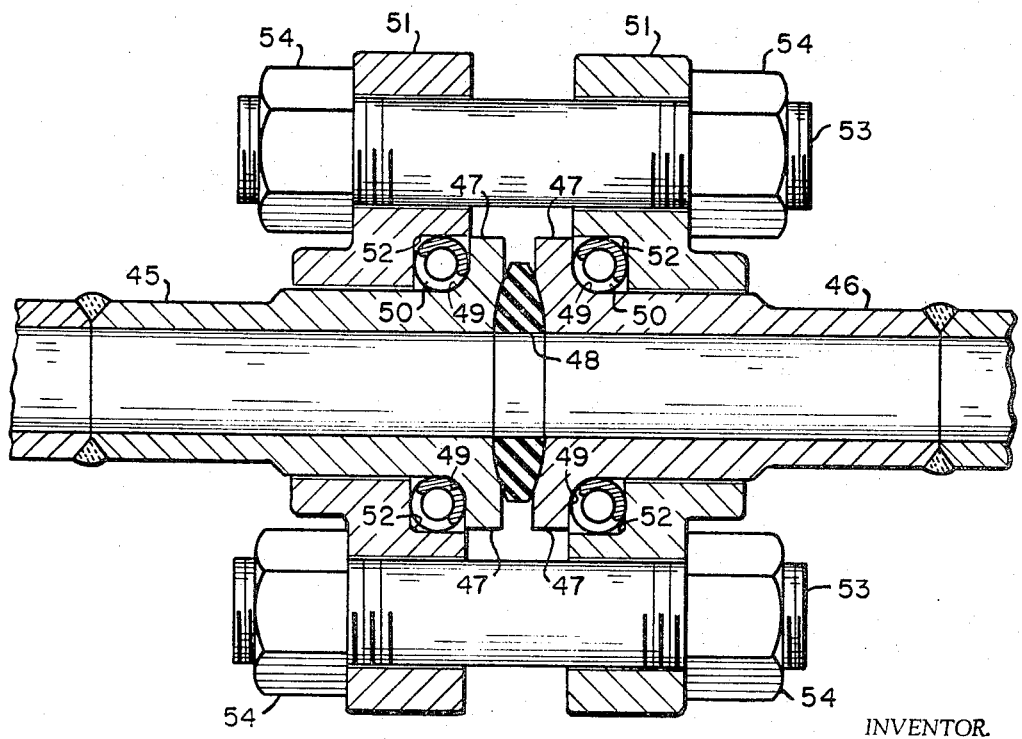
Figure 10:
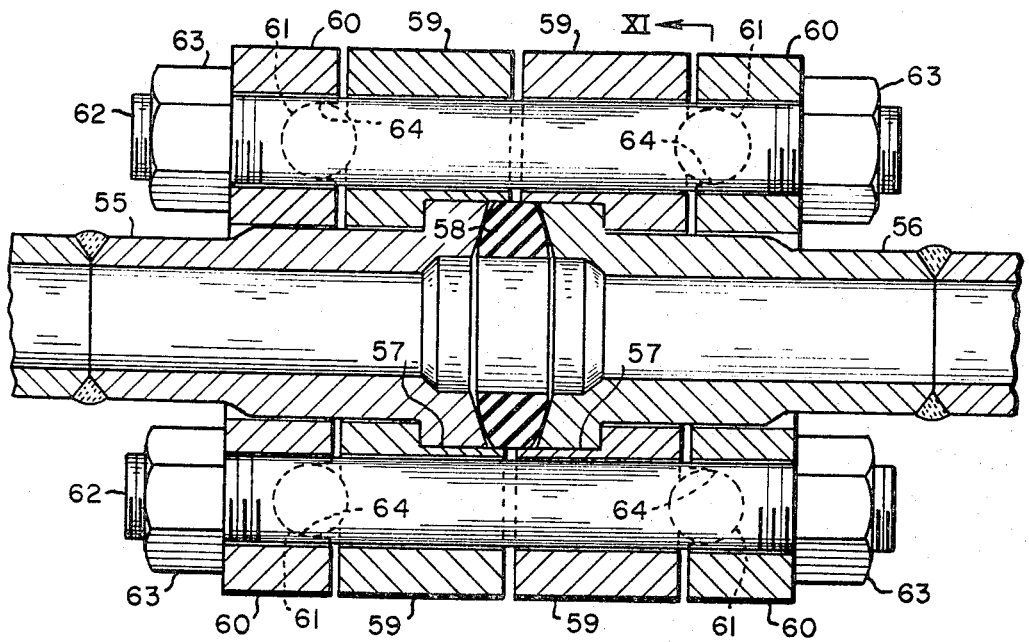
Figure 11:
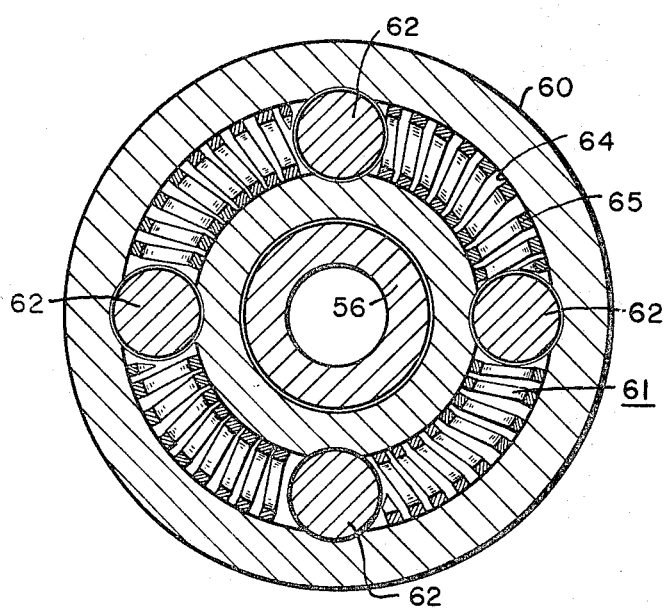

FIGURES 6 to 10 inclusive are longitudinal sections of additional forms of couplings embodying my invention, and FIGURE 11 is a section along the line XI—XI of FIGURE 10.

Figure 1:
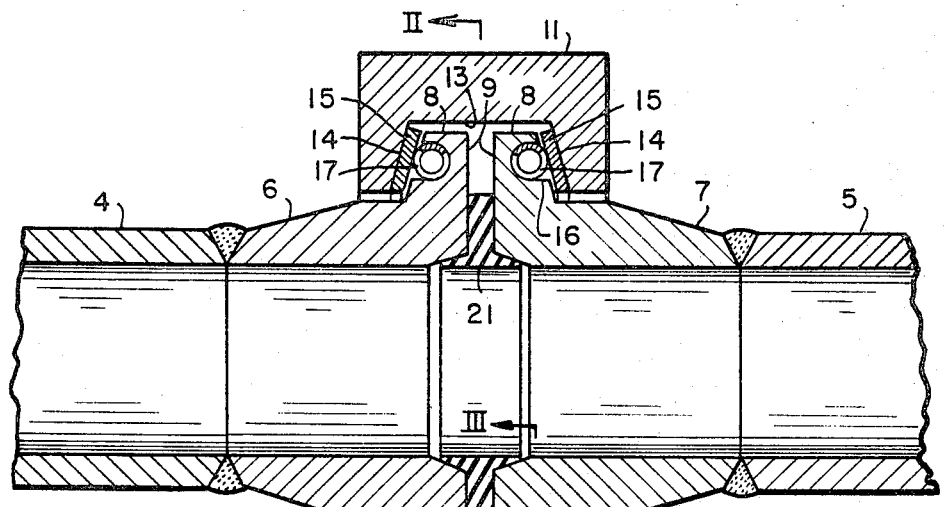
FIGURE 1 is a longitudinal section of one form of coupling embodying my invention and of portions of tubing which are connected end to end by the coupling.

Referring to FIGURE 1 of the drawings, there is shown portions of two pipe lengths 4 and 5 which are joined end to end by a resilient coupling embodying my invention. The coupling comprises two hubs 6 and 7 which are welded to the ends of the pipes 4 or 5. Each hub has a radially extending flange 8, with sides 9 which are adjacent and opposite to each other and sides 10 which form surfaces extending radially from the hubs 6 and 7 and sloping towards the opposite flange.

A split clamp having two or more identical portions 11 and 12 surrounds the flanges 8 of the hub half portions. Each of the clamp portions has a groove 13 into which the flanges 8 extend. The sides 14 of the grooves 13 face and approximately parallel the surfaces 10 of the flanges 8 but are spaced from these surfaces, and the portions of the members 11 and 12 on each side of the grooves 13 form rings substantially surrounding flanges 8 of hubs 6 and 7.

A circular thrust washer 15 rests against each of the sides 14 of the ring portions at each side of the groove 13, and each flange 8 has a groove 16 formed in the surface 10 of each flange and extending around the flange. Each groove 16 carries a resilient member 17 which is tubular in cross section and which extends in the groove completely around the flange. The member 17 may be a spiral spring, a continuous metal tube, segments of tubes or springs, or C-shaped segments positioned side by side. In this specification, the resilient ring like member will be described as a helical spring for the sake of brevity. It will be understood, however, that other forms of resilient ring like members can be used. As shown in FIGURE 1, the outside diameter of the coils of the helical spring 17 is such that it extends beyond the surfaces 10 of the flanges and engages the thrust washers 14 and holds these washers spaced slightly away from the surfaces 10 of the flanges.

Figure 2:
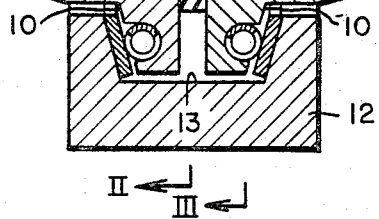
FIGURE 2 is a section along the lines II—II of FIGURE 1.

As shown in FIGURE 2, the portions 11 and 12 of the split clamp have radially extending lugs 18. Bolts 19 pass through the opposed lugs of both clamp halves and carry nuts 20 for holding the two halves of the split clamp together around the flanges 8. As appears from FIGURES 1 and 2, when the nuts 20 are tightened on the bolts 19, the two halves of the clamp are brought together, and because the surfaces 10 of the flanges 8 are sloped towards each other and the sides 14 of the grooves 13 in the clamp halves complement the sloping surfaces 10, the hubs 6 and 7 are forced axially towards each other.

A seal ring 21 is placed between the sides 9 of the flanges 8 to make a tight seal between the hub portions 6 and 7.

The dimensions of the helical springs 17 of the flanges 8 and of the grooves 13 in the clamp halves are such that when the nuts 20 are tightened on the bolts 19, the coils of the helical springs 17 are compressed so as to exert a resilient force tending to force the two hubs 6 and 7 towards each other and against the ring seal 21. If the material passing through the pipes 4 and 5 is at a lower temperature than the ambient temperature, the portions of the hubs 6 and 7 adjacent the seal 21 and the flanges 8 will contract both radially and axially. Because of the thickness of the sections, there is an appreciable time lag before the outer portions of the hubs 6 and 7 and the flanges 8 reach the same temperature as the inner portions, and an even longer time elapses before the clamp halves attain, if ever, this same temperature. As a consequence of the contraction of the inner portions of the hubs 6 and 7 adjacent the seal 21 and the flanges 8, a loose fit between these parts and leakage at the joint would occur except for the fact that the springs 17, being under compression, exert a force between the clamp halves and the flanges which brings the flanges and the hubs 6 and 7 towards each other, thus maintaining a tight seal.

Because of the resilience of the spring 17 the opposite effect occurs when the inner portions of the hubs 6 and 7 adjacent the seal 21 and of the flanges 8 are subjected to a temperature higher than ambient. Upon expansion of these parts, the springs 17 are compressed, thus preventing overtightening of the joint and possible extrusion of the seal 21. The resilient springs 17 take care of thermal expansion and contraction of the portions of the hubs 6 and 7 adjacent the seal 21 and of the flanges 8 only. Expansion and contraction of the pipe lengths 4 and 5 and of the portions of the hubs outside the clamping members 11 and 12 being taken care of by other means.

The important function of the springs, however, is to take care of rapid cycling of pressure and temperature conditions between low or high extremes and ambient or between low and high extremes. In the absence of a resilient means for compensating for thermal or pressure expansion or contraction, rapid cycling of temperature or pressure would produce early fatigue and failure of parts of the coupling subjected to these cycling conditions.

Figure 3:
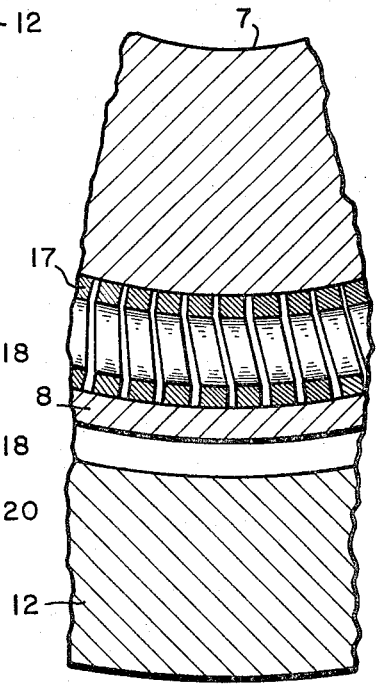
FIGURE 3 is a section along the lines III—III of FIGURE 1 but on an enlarged scale.

The spring wire can have any shape in section. However, in order to obtain maximum load and maximum deflection from the helical springs 17, the cross-section of the wire used in forming the springs is square as shown in FIGURE 3. It should be here noted that the coils of the spring are square in section only after the spring has been formed. The springs are made by coiling wire which is trapezoidal in section before it is coiled. When it is coiled, the resulting spring has coils which are square in section due to the fact that in coiling the inner side of the wire tends to spread, and the outer side of the stock tends to contract.

The mean diameter of the groove 16 for the spring 17 is determined by the diameter of the hub portions 6 and 7. The diameter of the coils of the spring 17 and the cross-sectional area of the wire are determined by the loading to which the spring is subjected in use, the cross-section of the wire being determined to give maximum resiliency or deflection of the spring within its elastic limits.

FIGURE 4 is a half longitudinal section of a modified form of my coupling showing the position of the parts of the coupling when the interior of the coupling is subjected to a low temperature relative to ambient temperature. In this form of my invention, grooves 22 are formed in the sides 14 of the grooves 13 in the portions 11 and 12 of the split clamp for holding a helical spring 17. It will be noted from FIGURE 4 that the groove is substantially square in cross-section, with, however, rounded interior corners, to avoid notch effects. A thrust washer 15 is placed between the spring 17 and the sloping surface 10 of each flange 8 of each hub. When the interior of the coupling is subjected to a cold medium flowing through the tubing and coupling, the portions of the hubs adjacent the seal 21 and the flange will shrink thus tending to create a loose joint. However, the force of the compressed springs 17 presses the washers 15 against the flanges 8, and the flanges are pressed towards each other to maintain a tight joint. When the temperature within the coupling increases, the parts will expand and the springs 17 will be compressed, thus maintaining a tight joint between the two half sections of the hub.

FIGURE 5 is a longitudinal half section similar to FIGURE 4 but showing the parts in position when the interior of the coupling is subjected to a temperature which is high relevant to ambient temperature. In such case, thermal expansion of the portions of the hubs adjacent the seal 21 and of the flanges will tend to move the sides 10 of the flanges 8 of the half section toward the sides 14 of the grooves 13 in the clamp portions. In such case, the spring 17 will be compressed and thus prevent overloading of the joint and possible extrusion of the seal 21.

FIGURE 6 shows a modified form of my invention in which the flanges 8 of the hubs 6 and 7 do not have outer sides which slope towards each other. Instead, the flanges 8 have outer sides 10' which are normal to the axis of the hubs 6 and 7. The grooves 13 in the clamp portions 11 and 12 have sloping sides 14 the same as those shown in FIGURE 1, and between the flanges 8 of the hubs and the sides 14 of the clamp portions 11 there are thrust washers 23 which have sides 24 which correspond to the outer sides of the flanges 8 and sloping sides 25 which correspond to the sloping sides 14 of the clamp portions 11 and 12. Grooves 26 are formed in the sides 25 of the thrust washers 23 to position resilient springs 17. The operation of the coupling shown in FIGURE 6 is the same as that described with reference to the couplings shown in FIGURES 1, 4 and 5 of the drawings.

FIGURE 7 shows a further embodiment of my invention in which the hubs 6 and 7 of the coupling have flanges 8 with outer sides 27. Approximately square-shaped grooves 28 cut in the upper and outer corners of the flanges provide two-sided seats for spiral springs 29.

A split clamp for holding the hubs 6 and 7 together comprises two opposed rings 30 which surround the flanges 8 and are pressed towards each other by bolts 31 and nuts 32. The inner sides of the rings have approximately square-shaped recesses 33 which provide seats for the springs 29 opposite to those provided by the grooves 28 in the flanges. The operation of the coupling shown in FIGURE 7 is the same as those shown in FIGURES 1, 4 and 5 of the drawings.

FIGURE 8 shows a resilient coupling having two hubs 34 and 35 each having a flange 36 at one end. The flanges 36 face each other and hold between them a lens ring seal 37. It will be noted from FIGURE 8 that the hubs 34 and 35 are thinner than the hubs in the couplings previously described and also that the flanges 36 have a smaller diameter than the flanges of the couplings previously described. Flange rings 38 surround the hubs 34 and 35 and abut against the flanges 36 and, in effect, constitute radial and axial extensions of the flanges. This arrangement is used to decrease the cost of a coupling when the hubs and integral flanges are made of relatively costly metal such as corrosion resistant steel because the rings 38 which act as extensions of the flanges 36 may be made of less expensive material.

The outer corners of the rings 38 have recesses 39 which seat resilient members 40 which, in the couplings shown in FIGURE 8, are coiled helical springs. To increase the strength of the resilient member, a second helical spring 41 may be placed inside the first spring.

The coupling shown in FIGURE 8 includes a split clamp in the form of two rings 42, each of which surrounds a hub and abuts against the outer periphery of a resilient member 40.

Bolts 43 extending parallel to the axis of the hubs 34, arranged in a circle around the hubs and passing through the clamp rings 42 and the flange rings 38, have nuts 44 which may be tightened to draw the rings towards each other and thereby move the hubs 34 and 35 towards each other and compress the lens ring seal 37.

It will be noted that, in the coupling shown in FIGURE 8, the helical springs 40 extend around the hubs 34 and 35 and outside the circle in which the bolts 43 are arranged. By placing the helical springs 40 outside the bolts, it is possible to have springs of whatever diameter is desired (providing, of course, the rings 38 and 42 have corresponding diameters). By increasing the diameter of the helical springs 40 (and thereby their length), the total area of contact between the helical springs and the rings 38 and 42 can be increased to withstand greater forces tending to separate the hubs 34 and 35.

The operation of the coupling shown in FIGURE 8 is the same as that of the couplings previously described.

The coupling shown in FIGURE 9 comprises two hubs 45 and 46 which have flanges 47 which face each other and hold between them a lens ring seal 48. The angle between the hubs and the flanges is radiused as at 49 to form seats for resilient ring-like elements 50.

A split clamp for pressing the hubs 45 and 46 towards each other comprises two rings 51 which surround the hubs 45 and 46 and press against the outer peripheries of the resilient elements 50. It will be noted from FIGURE 9 that the inner corners of the rings 51 are recessed as at 52 to form seats opposite to the corners 49 between the flanges and the hubs for the resilient elements 50.

Bolts 53 extend parallel to the axes of the hubs 45 and 46, are positioned in a circle around the hubs and pass through the clamp rings 51. The bolts 53 carry nuts 54 which can be tightened to draw the rings towards each other to move the hubs towards each other and compress the resilient members.

The operation of the coupling shown in FIGURE 9 is the same as that of the couplings previously described.

The coupling shown in FIGURES 10 and 11 comprises two hubs 55 and 56 having opposed flanges 57 which hold between them a lens ring seal 58. The flanges 57 have flange rings 59 which enlarge the diameters of the flanges in the same manner as was described with respect to the flange rings 38 shown in FIGURE 8.

A split clamp for holding the hubs and flanges together includes clamp rings 60 which surround the hubs 55 and 56 and press axially against resilient elements 61 positioned in the space between the flange rings 59 and the clamp rings 60. Bolts 62 extend parallel to the axes of the hubs 55 and 56, are arranged in a circle around the hubs and pass through the flange rings 59 and the clamp rings 60. They carry nuts 63 which may be tightened to draw the rings towards each other and thereby move the hubs towards each other and compress the resilient members 61.

It will be seen from FIGURE 10 that the clamp rings 60 carry circular grooves in the surfaces of the rings which are opposite to the flange rings 59 and the resilient elements are seated in these grooves 64. As shown in FIGURE 11, the mean diameter of the grooves 64 is the same as the diameter of the circle on which the bolts 62 are positioned and the resilient elements 61 are in the form of lengths of resilient members 65 which are tubular in cross section and, in the example shown in FIGURE 11, constitute lengths of helical springs.

The action of the lengths of helical springs 65 so far as compensating for thermal expansion and contraction of the hubs and the flanges is concerned is the same as that which has been described with reference to earlier figures. However, it will be noted that the forces exerted by the bolts and by the helical springs act along the same lines in the case of the coupling shown in FIGURES 10 and 11 and, therefore, no bending moments are developed as in the case of the couplings, such as those shown in FIGURES 7 to 9, inclusive, in which the forces developed by the bolts and the resilient tubular elements act along lines which are spaced different distances from the center axis of the hubs.

In all of the embodiments of the invention, I have described the coupling as having two resilient members, one on each hub. A coupling embodying my invention can be made with only one resilient member on one hub. In such case, the one member will have a strength greater than each of the two members and there will be less resiliency than if two resilient members were used.

While I have described certain preferred embodiments of my invention, it is to be understood that they may be otherwise embodied within the scope of the appended claims.

I claim:

1. A resilient coupling for connecting two lengths of tubing end to end comprising:
   (a) two hubs
      (1) each hub having an end to be secured to one of the tubing lengths to be connected,
      (2) a flange extending radially from the other end of each hub, each flange having a first surface facing a corresponding surface on the flange of the other hub and a second surface extending outwardly from the hub and axially removed from the facing surfaces,
   (b) a split clamp having:
      (1) portions which substantially surround the hubs,
      (2) said clamp portions having surfaces extending opposite to but spaced from the outwardly extending second surfaces of the flanges which are removed from said first facing surfaces of the flanges,
   (c) a resilient ring-like member extending around each of the hubs in the space between said second surfaces on the flanges and the opposed surfaces on the clamp portions
      (1) each of said ring-like members having a tubular cross section in the plane parallel to the axis of said ring-like member,
   (d) a resilient seal ring positioned between said first facing surfaces of the flanges, and
   (e) means for drawing the clamp portions toward each other to move the hubs toward each other and compress said resilient ring-like members and said resilient seal ring whereby said coupling may be subjected to rapid cycling of pressure and temperature conditions.

2. A resilient coupling as described in claim 1 in which said resilient ring-like members are helical springs.

3. A resilient coupling as described in claim 2 in which the coils of said helical springs are square in section.

4. A resilient coupling as described in claim 1 in which at least one of the opposed surfaces on the flanges and on the clamps between which each resilient ring-like member extends has a groove for positioning said member.

5. A resilient coupling as described in claim 1 and having an annular thrust washer against one side of each resilient ring-like member.

6. A resilient coupling for connecting two lengths of tubing end to end comprising:
   (a) two hubs
      (1) each hub having an end to be secured to one of the tubing lengths to be connected,
      (2) a flange on each hub extending radially from the other end of each hub, each flange having a first surface facing a corresponding surface on the flange on the other hub,
      (3) a second surface on each flange extending outwardly from the hub and sloping axially from the hub toward the opposed flange,
   (b) a split clamp having:
      (1) portions which together substantially surround the flanges,
      (2) grooves in said clamp portions having side surfaces which face and approximately parallel said sloping surfaces on the flanges, (c) a resilient ring-like member extending around each of the hubs in the space between the side surfaces of the grooves in the clamp portions and the sloping surfaces on the flanges
  (1) each of said ring-like members having a tubular cross section in the plane parallel to the axis of said ring-like member, (d) a resilient seal ring positioned between said first facing surfaces of the flanges, and (e) means for drawing the clamp portions toward each other to move the hubs toward each other and compress said resilient ring-like members and said resilient seal ring whereby said coupling may be subjected to rapid cycling of pressure and temperature conditions.

7. A resilient coupling for connecting two lengths of tubing end to end comprising:

(a) two hubs
  (1) each hub having an end to be secured to one of the tubing lengths to be connected,
  (2) a flange on each hub extending radially from the other end of each hub and having a first surface facing a corresponding surface on the flange on the other hub,
  (3) a second surface on each flange extending radially from the hub and removed axially from the facing surfaces of the hubs, (b) a split clamp having:
  (1) portions which together substantially surround the flanges,
  (2) said clamp portions having side surfaces which face said second radially extending surfaces on the flanges and which slope inwardly and axially away from said flange surfaces and grooves formed in said clamp portion side surfaces, (c) an annular thrust washer having an axially extending surface abutting against said second flange surface and a sloping surface extending generally parallel but spaced from the sloping side surfaces of the split clamp portions, (d) a resilient ring-like member extending around each hub in the space between said sloping surfaces of the thrust washers and of the split clamp portions
  (1) each of said ring-like members having a tubular cross section in the plane parallel to the axis of said ring-like member, (e) a resilient seal ring positioned between said first facing surfaces of the flanges, and (f) means for drawing the clamp portions towards each other to move the hubs toward each other and compress said resilient ring-like members and said resilient seal ring whereby said coupling may be subjected to rapid cycling of pressure and temperature conditions.

8. A resilient coupling for connecting two lengths of tubing end to end comprising:

(a) two hubs
  (1) each hub having an end to be secured to one of the tubing lengths to be connected,
  (2) a flange on each hub extending radially from the other end of each hub and having a first surface facing a corresponding surface on the flange on the other hub,
  (3) a second surface on each flange extending radially outwardly from the hub and normal to the axis of the hub and spaced axially from the first surfaces of the hubs, (b) a split clamp comprising two rings each surrounding one of the hubs and having a radially extending surface opposite to but axially spaced from said outwardly extending second surfaces of the flanges, (c) a resilient ring-like member extending around each hub in the space between the opposed radially extending surfaces of the flanges and of the rings
  (1) each of said ring-like members having a tubular cross section in the plane parallel to the axis of said ring-like member, (d) a resilient seal ring positioned between said first facing surfaces of the flanges, and (e) means for drawing the rings toward each other to move the hubs toward each other and compress said resilient ring-like members and said resilient seal ring whereby said coupling may be subjected to rapid cycling of pressure and temperature conditions.

9. A resilient coupling as described in claim 8 in which the means for drawing the rings of the split clamp towards each other comprises bolts extending parallel to the axis of said hubs and passing through said clamp rings and in which said resilient ring-like members extend around the hubs and outside said bolts.

10. A resilient coupling as described in claim 8 in which the surfaces of the clamp rings which oppose the second surfaces of the flanges have recesses extending around the hubs for retaining said resilient ring-like members.

11. A resilient coupling as described in claim 8 in which there is a second ring surrounding each hub and abutting against the flange on each hub, each ring being of larger diameter than the flange against which it abuts and in which said resilient ring-like members extend around the hubs and between said second rings and the rings forming the split clamp.

12. A resilient coupling as described in claim 11 in which the means for drawing the rings of the split clamp towards each other comprises bolts extending parallel to the axis of said hubs and passing through said clamp rings and said second rings and in which said ring-like members extend around the hubs and outside said bolts.

13. A resilient coupling as described in claim 8 in which the means for drawing the clamp rings towards each other comprises a plurality of bolts extending parallel to the axis of the hubs, positioned equidistantly in a circle around said axis and passing through said flanges and said rings and in which said lengths of said ring-like members extend around said hubs in the same circle in which the bolts are positioned.

14. A resilient coupling as described in claim 13 in which the surfaces of the clamp rings which oppose the flanges have grooves for positioning said lengths of resilient ring-like members.

References Cited

UNITED STATES PATENTS

| | | | |
|---|---|---|---|
| 1,064,515 | 6/1913 | Miller | 285—414 X |
| 2,219,161 | 10/1940 | Jacobs | 285—365 |
| 2,773,710 | 12/1956 | Smith | 285—367 X |
| 2,831,708 | 4/1958 | Kircher | 285—368 X |
| 3,038,743 | 6/1962 | Zaloumis | 285—363 X |
| 3,218,095 | 11/1965 | Wiltse | 285—365 X |
| 3,332,710 | 7/1967 | Doty | 285—368 X |

FOREIGN PATENTS

| | | |
|---|---|---|
| 484,214 | 6/1952 | Canada. |
| 994,834 | 8/1951 | France. |
| 1,034,886 | 4/1953 | France. |
| 528,413 | 6/1931 | Germany. |
| 917,219 | 8/1954 | Germany. |

EDWARD C. ALLEN, *Primary Examiner.*

THOMAS F. CALLAGHAN, *Assistant Examiner.*